United States Patent [19]

Pompe

[11] Patent Number: 4,840,681
[45] Date of Patent: Jun. 20, 1989

[54] CONTACT LENS CLEANING DEVICE AND METHOD

[76] Inventor: Larry W. Pompe, 115-½E. Litchfield Ave., Willmar, Minn.

[21] Appl. No.: 230,438

[22] Filed: Aug. 10, 1988

Related U.S. Application Data

[62] Division of Ser. No. 22,813, Mar. 9, 1987, Pat. No. 4,779,300.

[51] Int. Cl.⁴ .............................................. B08B 1/00
[52] U.S. Cl. ................................................... 134/42
[58] Field of Search ........................................... 134/42

[56] References Cited

U.S. PATENT DOCUMENTS

| | | | |
|---|---|---|---|
| 928,598 | 7/1909 | Gibbs | 38/102.2 |
| 1,244,892 | 11/1917 | Preyer | 38/102.2 |
| 2,079,600 | 5/1937 | Brooks | 15/214 |
| 2,121,701 | 6/1938 | Landers | 15/214 |
| 2,867,954 | 1/1959 | Phillips | 15/214 |
| 3,148,404 | 9/1964 | Jensen | 15/214 |
| 4,434,520 | 3/1984 | Caniglia | 15/214 |
| 4,779,300 | 10/1988 | Pampe | 15/104.93 |

OTHER PUBLICATIONS

The Boston Lens Cleaning Polish and Manual Polishing Machine Instruction Sheet. (1982)

*Primary Examiner*—Asok Pal
*Attorney, Agent, or Firm*—Burd, Bartz & Gutenkauf

[57] ABSTRACT

A method of cleaning a contact lens comprising providing a flexible cleaning pad, providing support means for the cleaning pad having a central opening and outer peripheral side walls, providing a base member interconnected with the outer side walls of the support means and the edges of the cleansing pad to hold the cleansing pad in place, applying a lens cleansing solution to the portion of the cleansing pad spanning the central opening of the support means, and applying a contact lens to be cleansed in generaly reciprocal action to the portion of the cleansing pad having cleansing solution.

10 Claims, 1 Drawing Sheet

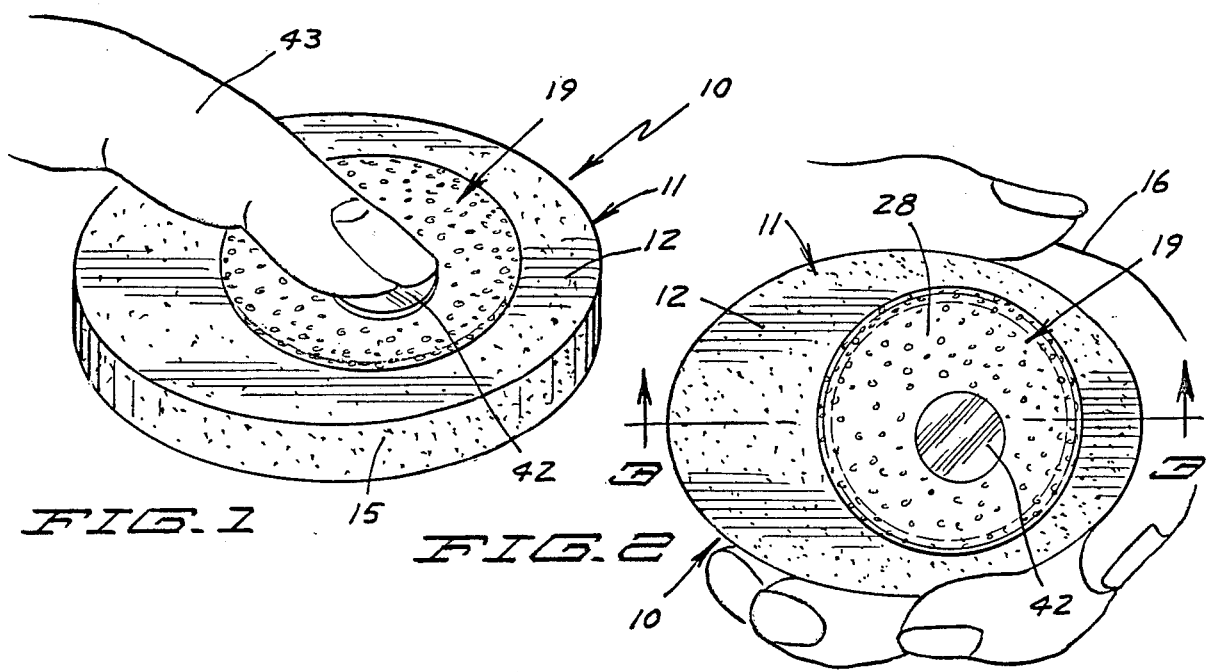
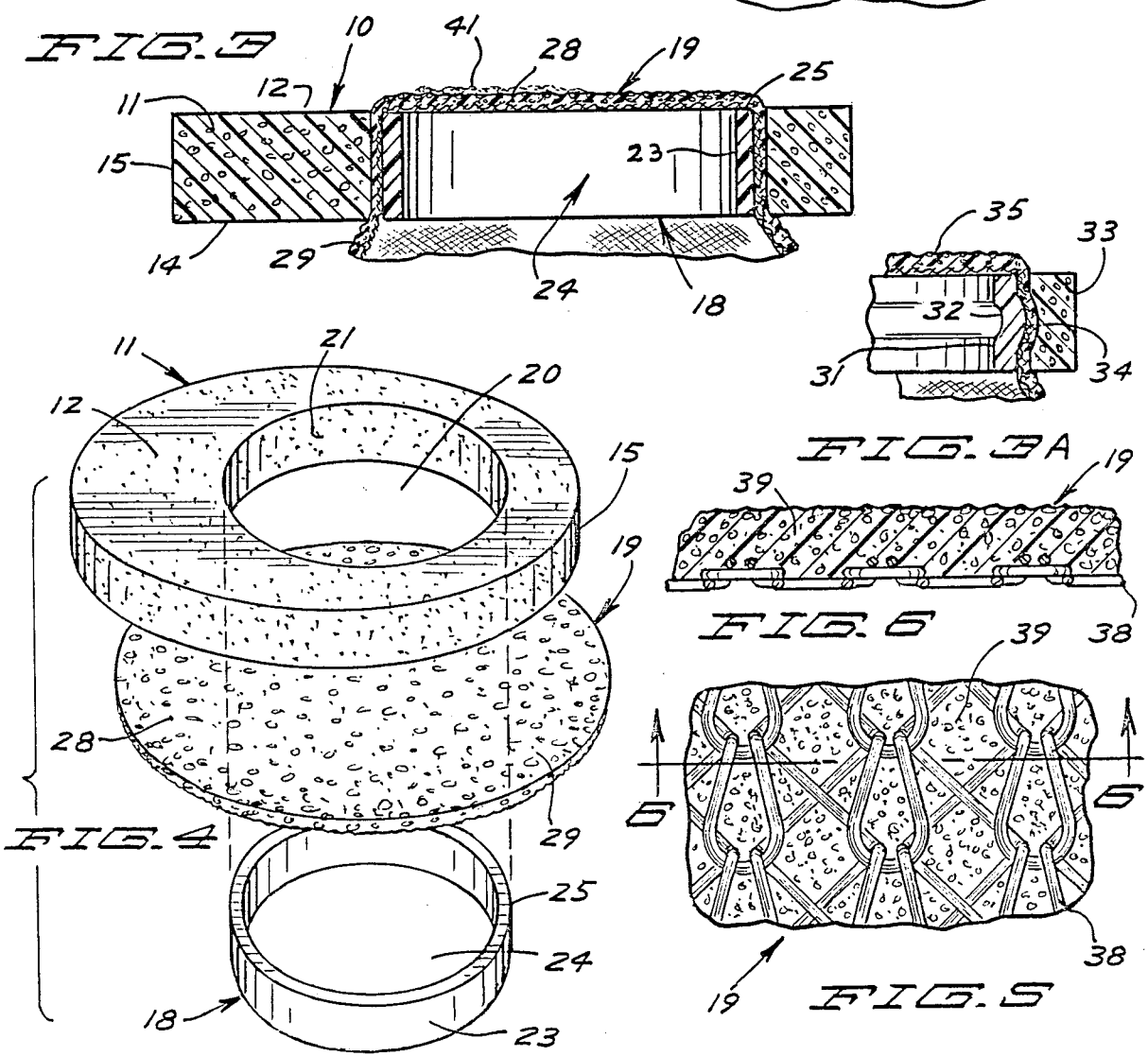

CONTACT LENS CLEANING DEVICE AND METHOD

This is a division of application Ser. No. 022,813 filed Mar. 9, 1987, now U.S. Pat. No. 4,779,300.

BACKGROUND OF THE INVENTION

A leading cause of contact lens discomfort and shortened wearing time is the failure of the wearer to keep lenses free of surface deposits and coatings. These hard-to-clean coatings on lenses are due to tear film mucus and protien, cosmetic, smog and air pollution and many other substances that are present in our daily lives. Failure to clean off these deposits can result in lens dryness, blurriness or other eye irritations.

Contact lens cleaning solutions for both soft and rigid lenses rely primarily upon the user rubbing or scrubbing their lenses against the skin of the plam of the hand or fingers. This is a hazardous and inefficient cleaning method at best and often results in scratched, nicked or torn lenses. Skin roughness and minute particles imbedded in the skin can easily scratch or damage a lens and the natural oiliness of the skin can even add to lens surface build-up.

SUMMARY OF THE INVENTION

The invention pertails to a cleaning device primarily for the cleaning of contact lenses of both the hard and soft variety. The device includes a base or outer member having a mounting opening. A frame has an outer peripheral side wall of a shape to snugly fit within the mounting opening of the base. The frame also has an access opening. The access opening is covered by a cleaning pad or cloth. The central portion of the cleaning pad or cloth is stretched taut across the access opening of the frame, while edges of the cleaning cloth overlap the frame side wall and are frictionally engaged between the side wall of the frame and the surface walls of the base defining the mounting opening. Contact lens cleaning solution is applied to the central portion of the cleaning pad. The wearer rubs the contact lens against the pad on the cleaning solution, first one side and then the other. The lens is then raised and sterilized in the usual fashion. The contact lens cleaning pad is also rinsed. For convenience it can be removed fom the base and frame for the rinsing procedure. A used and worn cleaning pad is readily replaced. The base is optimally shaped as like an oval to comfortably fit in the palm of the hand. The base can be of a resilient material for snug receipt of the frame covered by the cleaning pad.

IN THE DRAWINGS

FIG. 1 is a view in perspective of the contact lens cleaning device of the invention shown in use during a lens cleaning procedure;

FIG. 2 is a top plan view of the lens cleaning device of FIG. 1 held in the palm of a hand;

FIG. 3 is an enlarged sectional view of the contact lens cleaning device of FIG. 2 taken along the line 3—3 thereof;

FIG. 3A is an enlarged sectional view of a portion of the contact lens cleaning device of FIG. 3 but showing a modification thereof;

FIG. 4 is an assembly view of the contact lens cleaning device of FIG. 1;

FIG. 5 is an enlarged fragmentary bottom view of a portion of the cleaning pad of the contact lens cleaning device of the invention; and FIG. 6 is a sectional view of a portion of the cleaning pad of FIG. 5 taken along the line 6—6 thereof;

DESCRIPTION OF A PREFERRED EMBODIMENT

Referring to the drawings, there is shown in FIGS. 1 through 4 a contact lens cleaning device indicated generally at 10 useful in cleaning contact lens of both the hard and soft variety as wall as other small and delicate items. Contact lens cleaning device 10 includes an outer member comprised as a base or holder 11 having a flat front face or surface 12 and a flat rear face or surface 14. Face 11 has a curved side wall 15 with an oval shape so as to fit optimally in the palm of a hand 16 as shown in FIG. 2.

Contact lens cleaner 10 also includes an inner member comprised as a frame or retaining ring 18 and a cleaning pad 19. Base 11 has a mounting or retaining opening 20 (see FIG. 4) defined by interior side wall 21 preferably circular in shape. Ring 18 is formed as a cylindrical segment having a cylindrical side wall 23 defining an access opening 24. Side wall 23 is shaped corresponding to mounting opening 20 of base 11. In the version of the cleaning device shown, side wall 23 is slightly smaller in peripheral dimension for a friction fit in mounting opening 20. Side wall 23 has a height corresponding to the thickness or width of base 11.

Cleaning pad 19 is circular in shape having a central portion 28 and a peripheral edge or skirt portion 29. The cleaning pad 19 is installed on ring 18 with the central portion 28 in spanning relatively to and relatively taut over the access opening 24. The edge or skirt 29 overlaps the upper edge 25 of side wall 23 of ring 18. As shown in FIG. 3, with the cleaning pad 19 so positioned with respect to the ring 18, both are installed in the mounting opening 20 of base 11. In the form shown in FIG. 3, base 11 is comprised of a somewhat resilient expanded foam material and ring 18 can be made of plastic. When installed in the mounting opening 20, the ring slightly expands the mounting opening. The skirt of cleaning pad 19 is wedged between the outer sidewall 23 of the ring 18 and the interior side wall 21 of the mounting opening 20. The holder or base 11 resiliently embraces the frame 18 and pad 19. The outer or cleaning surface 28 of the pad 19 is substantially coplanar or coextensive with the front surface 12 of base 11.

The ring 18 along with a cleaning pad 19 is readily insertable and removable from the mounting opening 20 for purposes of cleaning and replacement. The ring 18 could be held to the holder 11 by other means. For example, in FIG. 3A there is shown an inner member 31 having a peripheral rib 32. An outer member 33 has a groove 34 corresponding in shape to the rib 32. The inner member 31 and outer member 33 are engaged in a snap-fit relationship with the rib 32 engaged in the groove 34 while the skirt of a cleaning pad 35 is engaged and held between them. Other means could be employed for assemblying the inner and outer members together with the skirt of the cleaning pad lodged between them.

Cleaning pad 19 is comprised of a soft sheet-like material. In the version shown, cleaning pad 19 is comprised of a fabric and a foam or sponge material. As shown in FIGS. 5 and 6, cleaning pad 19 includes a first fabric layer 38 such as a Tricot fabric. A second layer 39 of foam or sponge material is bonded or otherwise made to adhere to the first layer 38. Foam layer 39 can be an open cell Polyurethane foam heat bonded to fabric 38. The foam layer 39 is oriented facing outwardly with respect to the base 11 when the ring 18 is installed therein. The foam 19 is of a material adapted to readily receive a surfactant such as a contact lens cleaning solution, while the first layer 38 provides a stable and strong support for the foam layer 39. Both are porous so as to readily be cleaned and rinsed, and both are somewhat elastic so as to be stretched taut across ring 18.

Base 11 is generally oval to fit comfortably in the palm of the average hand. It can typically have a major dimension of approximately 2.5 inch (6.35 cm.), a minor dimension of approximately 1.5 inch (3.80 cm.), and a thickness of approximately 0.5 inch (1.26 cm.).

In the use of contact lens cleaning device 10, a cleaning pad 19 is installed on the ring 18 with the central portion 28 in spanning relationship to the access opening 24 of ring 18 and skirt or edges 29 overlapping side walls 23. The ring 18 is pushed into the mounting opening 20 with the foam 39 facing upward to a position as shown in FIG. 3 with the cleaning pad approximately coplanar with the top surface 12 of base 11. A small amount of cleaning solution 41 is applied to the top surface of the central portion 28 of the cleaning pad 19. A contact lens 42 is placed on a top surface and manipulated thereon by a finger 43 preferably using a back and forth motion. A lens holder other than a finger can be used. When one side of the contact lens 42 has been scrubbed, it is turned over and the other side is cleaned. The central portion 28 of the pad 19 can be supported from the back side by inserting a finger or other instrument through the opposite or rear portion of the mounting opening 20. Once the contact lens is scrubbed, it is rinsed and sterilized in the normal fashion. The pad 19 is also rinsed either in place in the base 11 or it is removed for cleaning and rinsing. When the pad is worn out it is simply replaced with a new one.

While there has been shown and described certain embodiments of the invention, it will apparent to those skilled in the art that certain deviations can be had without departing from scope and spirit of the invention.

The embodiments of the invention in which an exclusive property or privilege is claimed are defined as follows:

1. A method of cleaning a contact lens comprising:
providing an annular member with outer uninterrupted side walls and an inner side walls defining a central opening covered with a cleaning pad spanning the central opening and having edges overlapping the outer side walls;
providing a base having inner side walls defining a mounting opening with a shape and dimension corresponding to the outer side walls of the annular member, with the annular member fitted into the mounting opening with the cleaning pad edges engaged between the inner walls defining the mounting opening and the outer side walls of the annular member;
applying a lens cleaning solution to the portion of the cleaning pad spanning the opening of the annular member;
applying a contact lens in reciprocal motion to the side of the cleaning pad having the cleaning solution to clean the contact lens.

2. The method of claim 1 wherein: the step of providing an annular member comprise providing a cylindrical member.

3. The method of claim 1 wherein: the step of providing a base comprises providing a base of resilient material.

4. The method of claim 3 wherein: the step of providing a cleaning pad comprises providing a cleaning pad of a laminate of foam type material and fabric type material.

5. The material of claim 4 wherein: the step of providing a base includes providing a base that is oval in shape so as to fit comfortably in a hand of a user.

6. A method of cleaning a contact lens comprising:
providing a flexible cleansing pad;
providing support means for the cleansing pad, having a central opening and outer peripheral side walls, with said cleansing pad spanning the central opening and edges extending beyond the central opening;
providing a base member interconnected with the outer side walls of the support means and the edges of the cleansing pad to hold the cleansing pad in place;
applying a lens cleaning solution to the portion of the cleansing pad spanning the central opening of the support means;
applying a contact lens to be cleaned in generally reciprocal motion to the portion of the cleansing pad having cleansing solution.

7. The method of claim 6 wherein: said step of providing a base member includes providing a base member having a mounting opening corresponding in shape to the outer peripheral side walls of the support means and having a dimension whereby the support means and edges of the cleaning pad are frictionally assembled in the mounting opening.

8. The method of claim 7 wherein: said step of providing support means having outer peripheral wall includes providing support means with a circular outer peripheral wall, and said step of providing a base member having a mounting opening includes providing a base member having a circular mounting opening.

9. The method of claim 8 wherein: the step of providing the base member includes providing a base member having generally oval shaped outer peripheral walls.

10. A method of cleaning a contact lens comprising:
providing an annular ring and a cleansing pad with a central portion stretched over the opening of the annular ring and edges overlapping the sides of the annular ring;
providing a base having an annular central opening of a dimension for friction fit of the annular ring with the cleansing pad stretched over the annular ring and having edges overlapping the sides wall of the annular ring;
installing the annular ring in the mounting opening of the base with the cleansing pad stretched over the opening of the annular ring;
applying a cleansing solution to the cleaning pad portion stretched over the opening of the annular ring;
applying a contact lens to be cleaned in generally reciprocal motion of the portion of the cleansing pad having cleaning solution.

* * * * *